(12) United States Patent
Ongaro et al.

(10) Patent No.: US 11,980,981 B2
(45) Date of Patent: May 14, 2024

(54) PLANT FOR PROCESSING PRODUCTS

(71) Applicant: MAAS Innovation S.R.L., Treviso (IT)

(72) Inventors: Gianluigi Ongaro, Treviso (IT); Mattia Ongaro, Treviso (IT)

(73) Assignee: MAAS Innovation S.R.L.

( * ) Notice: Subject to any disclaimer, the term of this patent is extended or adjusted under 35 U.S.C. 154(b) by 0 days.

(21) Appl. No.: 17/797,757

(22) PCT Filed: Feb. 5, 2021

(86) PCT No.: PCT/IB2021/050961
§ 371 (c)(1),
(2) Date: Aug. 5, 2022

(87) PCT Pub. No.: WO2021/156819
PCT Pub. Date: Aug. 12, 2021

(65) Prior Publication Data
US 2023/0073954 A1    Mar. 9, 2023

(30) Foreign Application Priority Data

Feb. 7, 2020  (EP) ..................................... 20156202

(51) Int. Cl.
*B23P 21/00*  (2006.01)
*B23Q 7/14*  (2006.01)

(52) U.S. Cl.
CPC .......... *B23P 21/004* (2013.01); *B23Q 7/1426* (2013.01)

(58) Field of Classification Search
CPC .............................. B23P 21/004; B23Q 7/1426
See application file for complete search history.

(56) References Cited

U.S. PATENT DOCUMENTS

| | | | | |
|---|---|---|---|---|
| 2,750,897 A | * | 6/1956 | Davis .................. | B23Q 7/1426 104/96 |
| 3,348,285 A | * | 10/1967 | Day .................... | B23Q 7/1426 29/33 R |
| 3,708,051 A | * | 1/1973 | Dato .................... | B23Q 7/1426 198/465.1 |
| 4,094,104 A | * | 6/1978 | Zerfahs ................ | B23Q 35/102 198/375 |
| 4,487,309 A | * | 12/1984 | Dorner ................. | B23Q 7/1426 198/463.4 |
| 4,575,328 A | * | 3/1986 | Fierkens ............. | B29C 45/0433 425/185 |
| 4,877,387 A | * | 10/1989 | Fierkens .............. | B23Q 7/1426 425/572 |

(Continued)

FOREIGN PATENT DOCUMENTS

| | | |
|---|---|---|
| DE | 19840363 A1 | 3/2000 |
| DE | 102007047279 A1 | 4/2009 |

(Continued)

*Primary Examiner* — Lawrence Averick
(74) *Attorney, Agent, or Firm* — Laubscher & Fretwell, P.C.

(57) ABSTRACT

A plant for managing products provides a plurality of work areas, each bounded by perimeter walls. Each work area has at least one robotic unit for moving and handling the products. The work areas are connected together by at least one overhead conveying unit for conveying products from one work area to another. The plant is efficient, reliable, versatile and safe.

11 Claims, 14 Drawing Sheets

(56) References Cited

U.S. PATENT DOCUMENTS

| | | | | |
|---|---|---|---|---|
| 4,890,725 | A * | 1/1990 | Fierkens | B29C 45/0433 |
| | | | | 198/774.1 |
| 4,938,334 | A * | 7/1990 | McGinn | B23Q 7/165 |
| | | | | 198/414 |
| 6,339,874 | B2 * | 1/2002 | Segawa | B23P 21/004 |
| | | | | 29/824 |
| 7,490,710 | B1 * | 2/2009 | Weskamp | B23Q 7/1426 |
| | | | | 29/33 P |
| 10,427,255 | B2 * | 10/2019 | Thorwarth | B62D 65/022 |
| 10,948,905 | B2 * | 3/2021 | Horn | B65G 47/90 |
| 2004/0255449 | A1 | 12/2004 | Koren et al. | |
| 2018/0029178 | A1 * | 2/2018 | Thorwarth | B23P 23/06 |
| 2018/0036845 | A1 * | 2/2018 | Thorwarth | B62D 65/022 |

FOREIGN PATENT DOCUMENTS

| | | |
|---|---|---|
| DE | 202015100782 U1 | 5/2016 |
| JP | H03136738 A | 6/1991 |
| JP | 2009274159 A | 11/2009 |

* cited by examiner

FIG.8
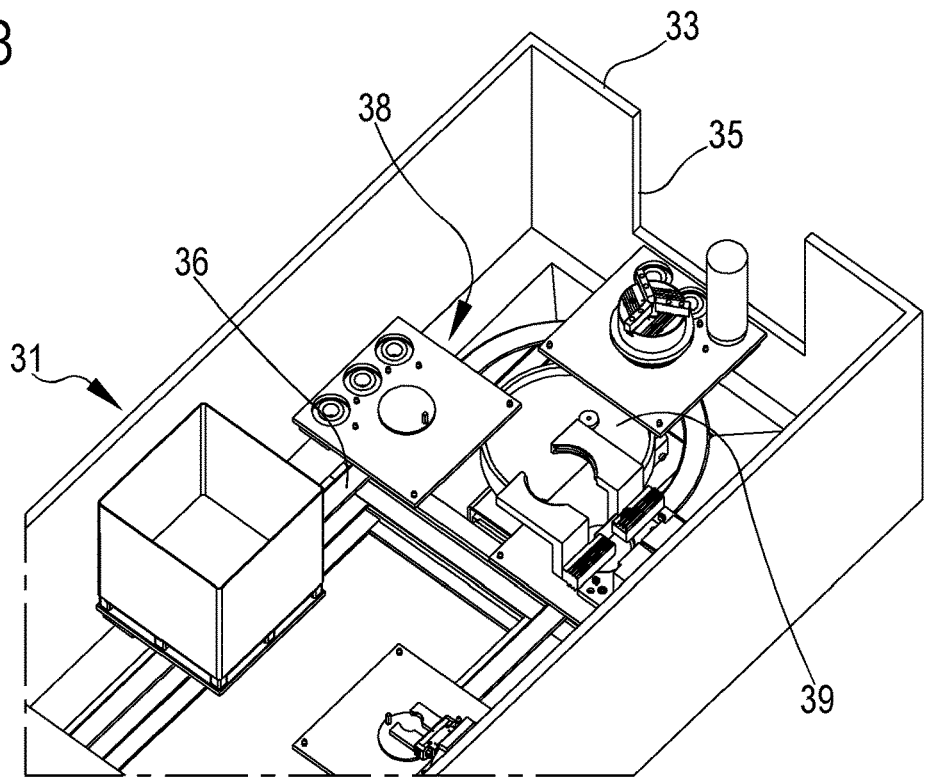
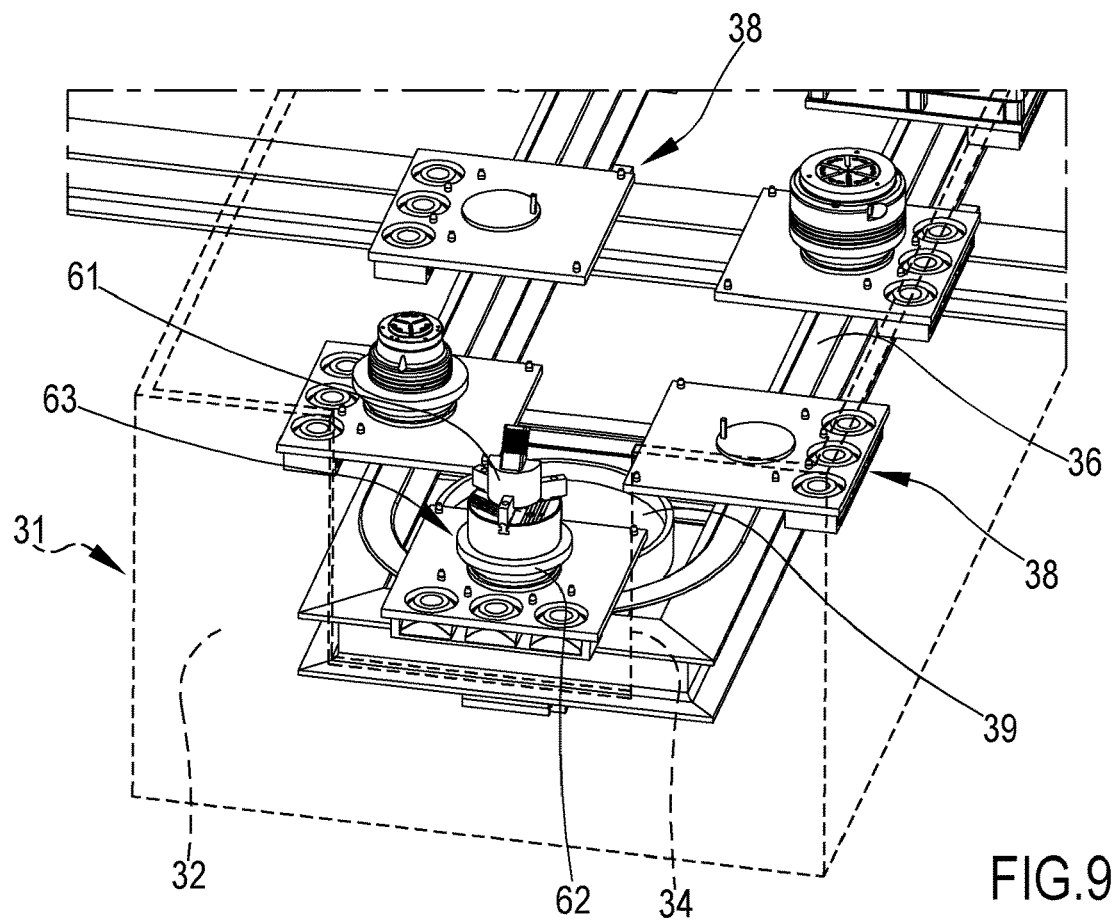
FIG.9

PLANT FOR PROCESSING PRODUCTS

CROSS-REFERENCE TO RELATED APPLICATIONS

This application is a § 371 National Stage Entry of International Patent Application No. PCT/M2021/050961 filed Feb. 5, 2021 which claims priority in EP Patent Application No. 20156202.2 filed Feb. 7, 2020. The entire content of these application is incorporated herein by reference.

BACKGROUND OF THE INVENTION

The present invention relates to a plant for managing products, which is usable in different sectors and designed for different purposes, for example processing components or storing and handling the products themselves.

The present invention relates to a highly automated modular plant for managing products, which can be managed by software.

Highly automated modular production plants managed by software are known.

United States patent application US2004/0255449 shows a reconfigurable integrated production system.

This system includes a plurality of production cells, each of which is associated with at least one step of the processing process.

The workpieces are moved inside each cell and are conveyed between one cell and another.

Such systems are often structurally and functionally complicated.

Further, such systems are bulky and for reasons of safety do not allow processing operators to move between the various cells.

SUMMARY OF THE INVENTION

One object of the present invention is to improve current production plants and generally automatic plants for managing products, so as to overcome the aforesaid limits of the prior art.

Another object of the present invention is to provide an automatic modular plant for managing products, which is organized in such a manner that excluding one modular work area does not compromise the production flow and introducing a new work area does not involve reconfiguring the plant.

Another object of the present invention is to provide an automatic modular plant for managing products that is reliable and versatile, that is able to adapt to different production needs.

Another object of the present invention is to provide an automatic modular plant for managing products, in particular a plant for processing components either in small batches or as single components (one piece flow).

Another object of the present invention is to provide an automatic modular plant for managing products in which the work of the operators who access the plant is functionally integrated with the automatic production cycle.

Another object of the present invention is to provide an automatic modular plant for managing products in which the safety of the operators who access the automatic modular plant is ensured.

Another object of the present invention is to provide an automatic modular plant for managing products in which it is easy to maintain and repair the machines.

These objects of the invention are achieved by a plant for managing products in accordance with claim 1.

BRIEF DESCRIPTION OF THE DRAWINGS

In order to better understand the invention, a description is given below of a non-limiting exemplary embodiment thereof, illustrated in the attached drawings in which:

FIG. 8 is a detail of FIG. 6;
FIG. 9 is another detail of FIG. 6.

DETAILED DESCRIPTION

Figure 1:
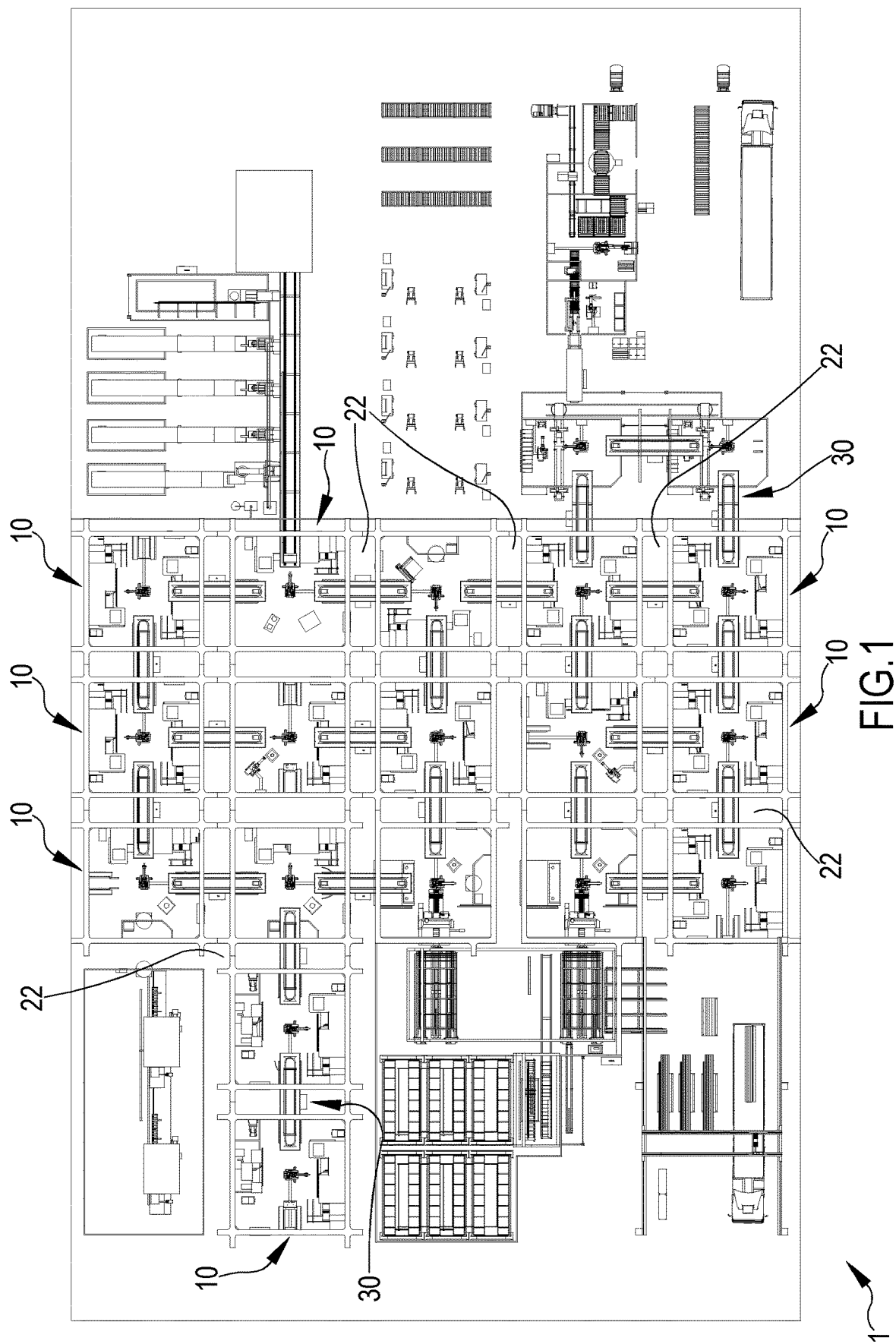
FIG. 1 is a plan view of the management plant.

With reference to the attached figures, a modular plant 1 is now disclosed for managing products, which is visible in FIG. 1. The plant 1 can work in a completely automated or partially automated manner, in particular an embodiment will be analyzed of a plant 1 for processing mechanical components in small batches or as single components (one piece flow) by operations of chip removal from a bar.

Figure 2:
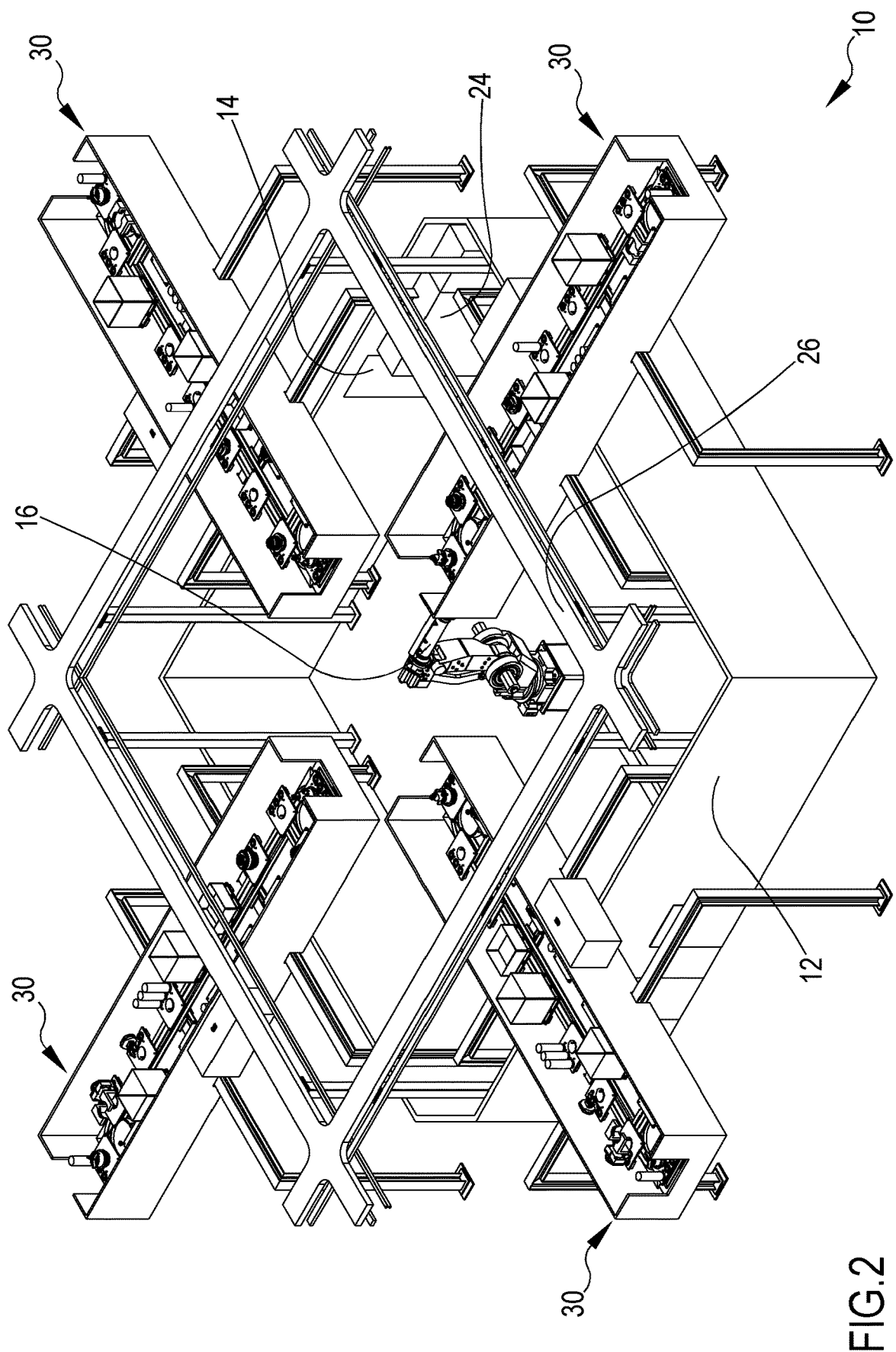
FIG. 2 is a perspective view of a modular unit of the management plant.
Figure 3:
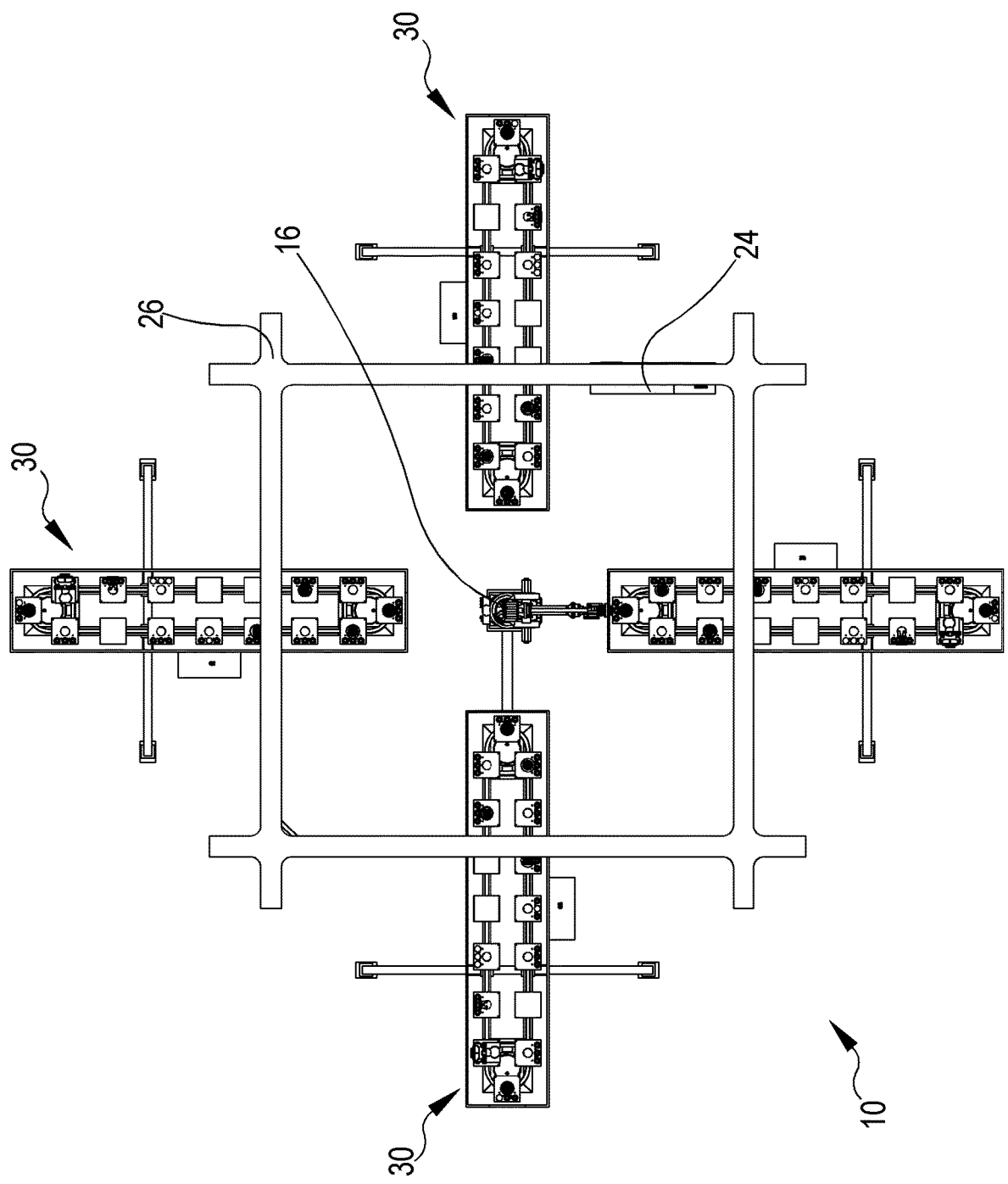
FIG. 3 is a plan view of the modular unit in FIG. 2.

The base unit of the modular plant 1 consists of a work area 10 bounded by perimeter walls 12, at least one of which is provided with at least one access 14 for accessing the modular plant 1. In the embodiment of FIGS. 2-3, the walls bound a work area 10 having a square shape. The possibility is not ruled out of using virtual alternatives such as photoelectric barriers, laser scanners or a combination of physical and virtual boundaries to bound the work area 10.

Figure 4:
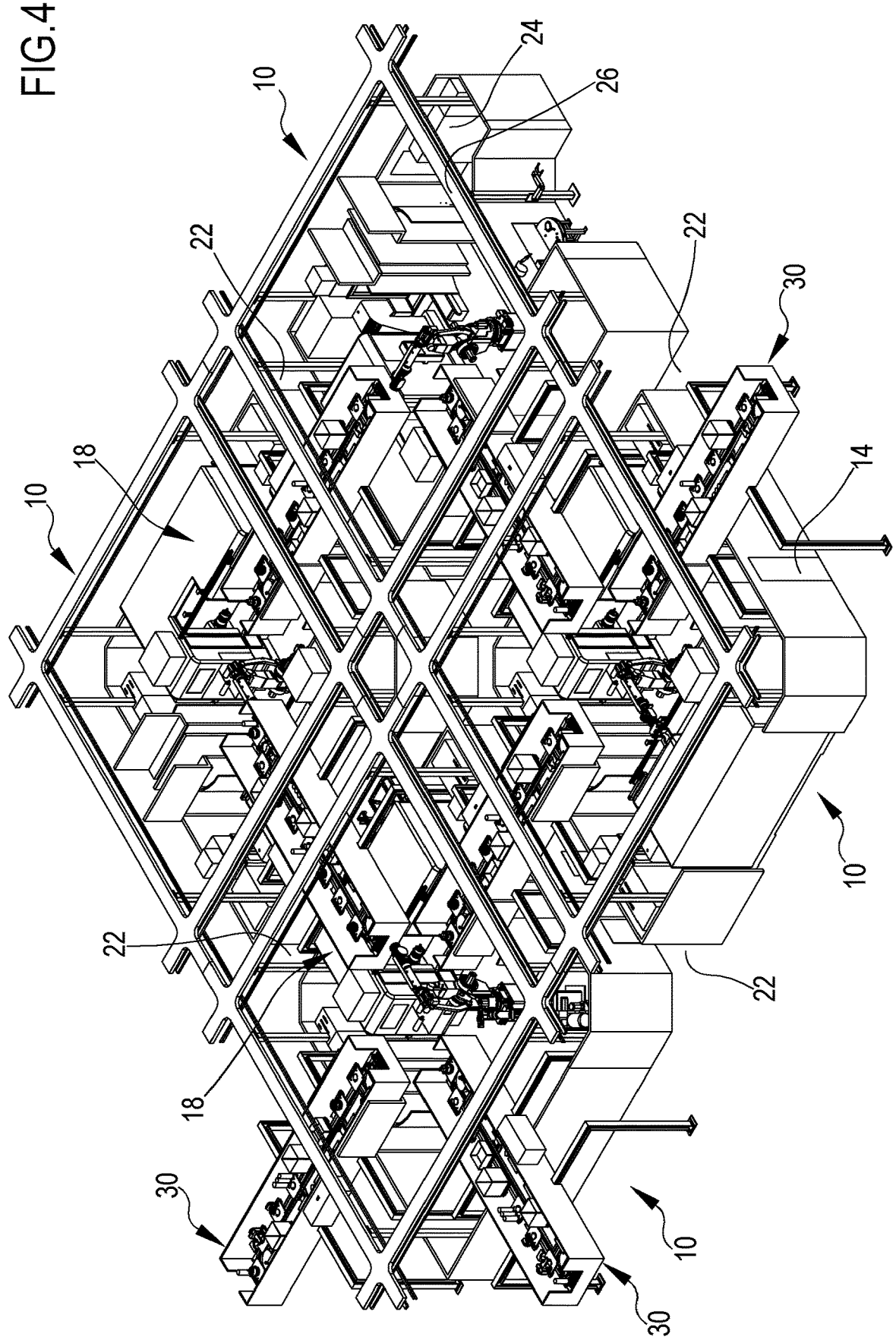
FIG. 4 is a perspective view of a plurality of modular units of the management plant.
Figure 5:
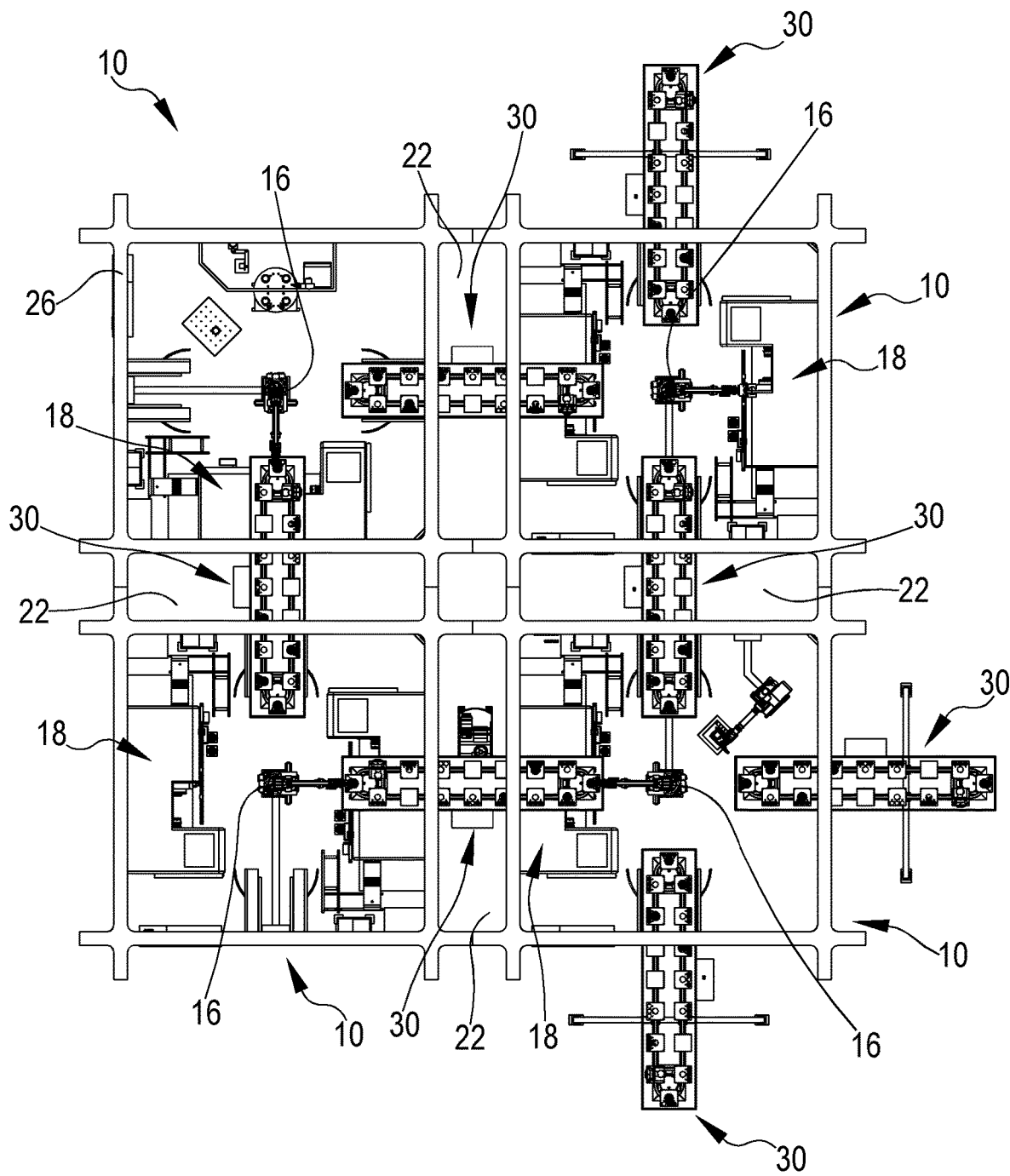
FIG. 5 is a plan view of the modular units in FIG. 4.
Figure 6:
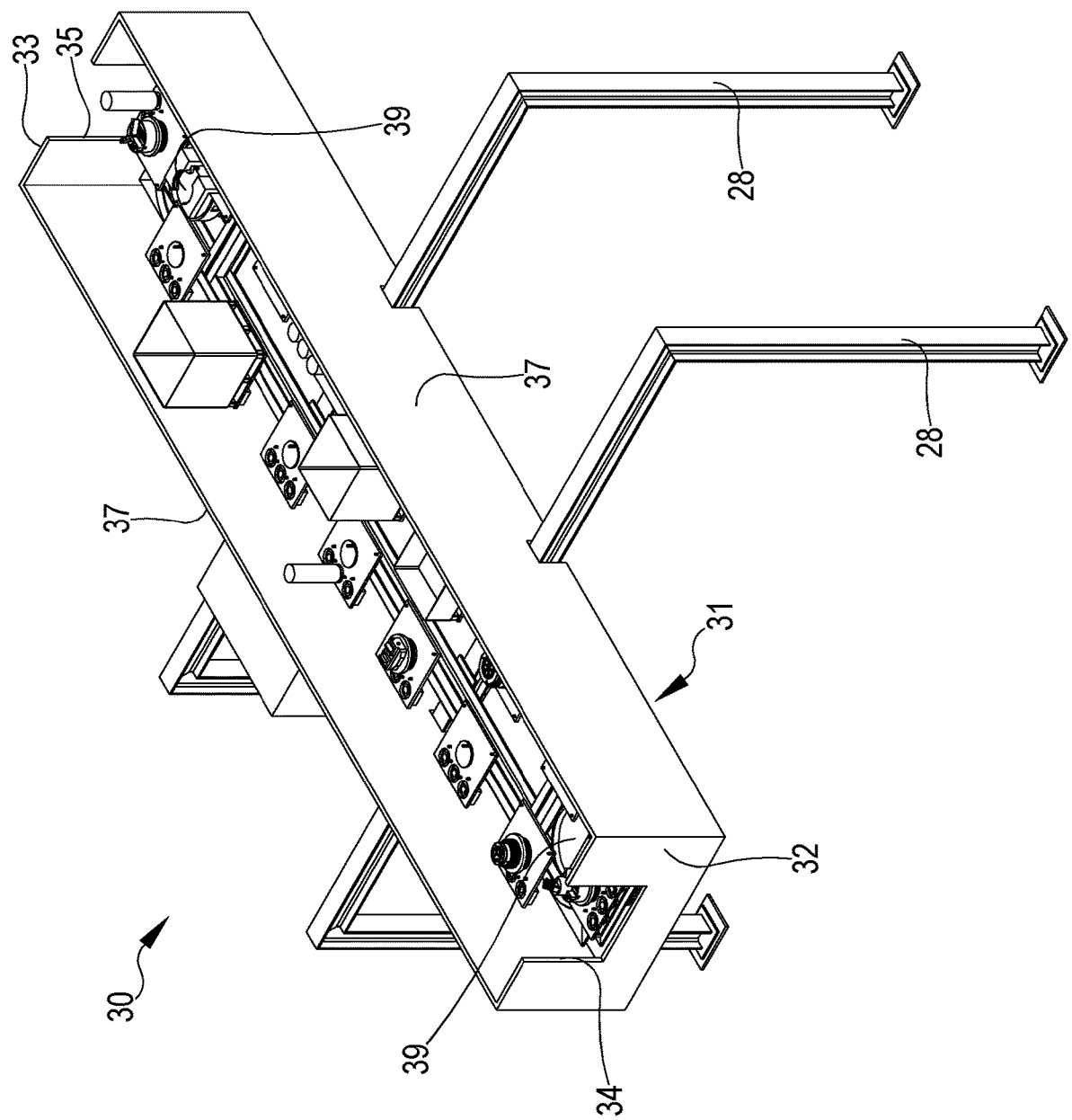
FIG. 6 is a perspective view of a device featured in the modular unit.
Figure 7:
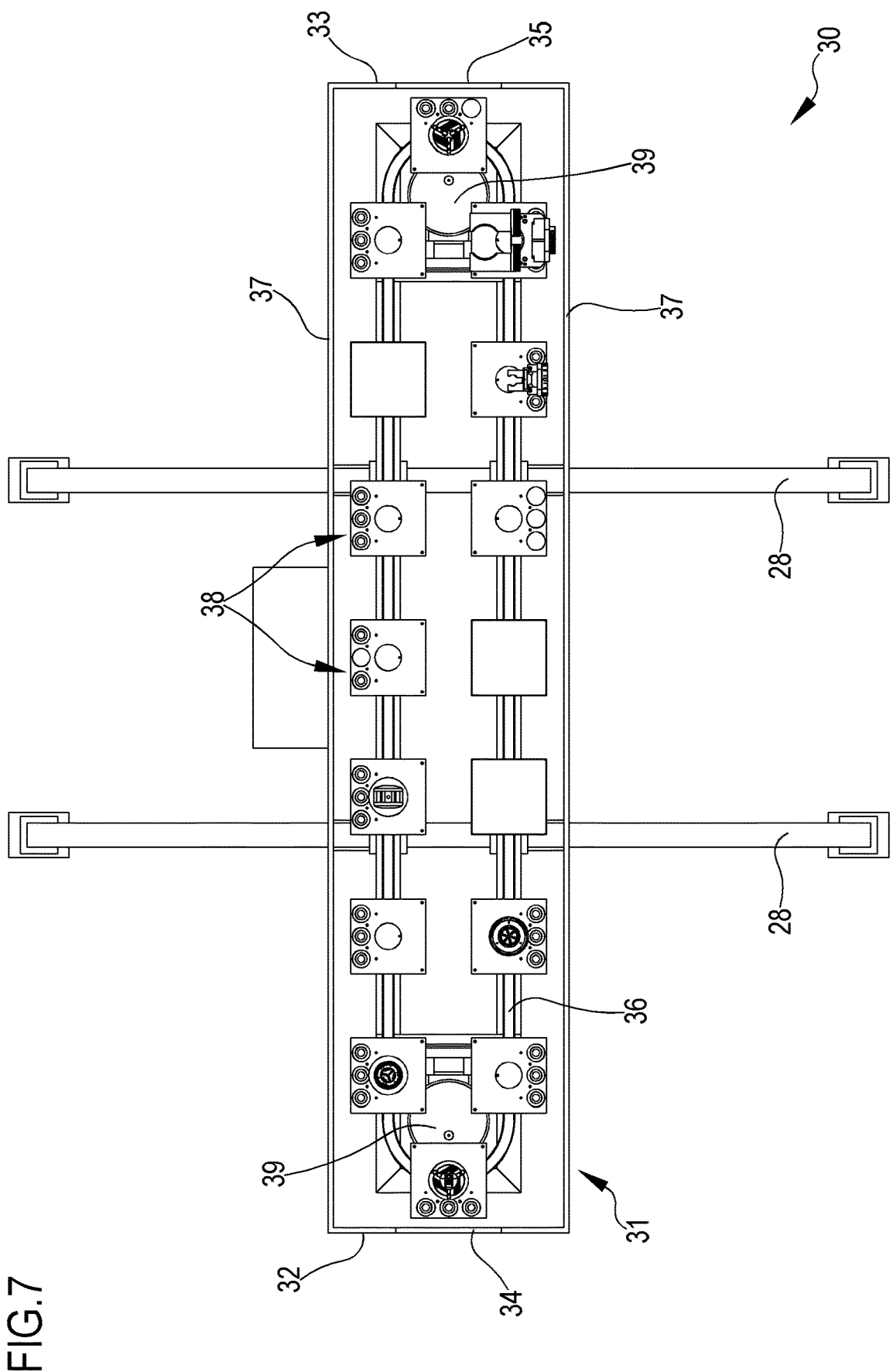
FIG. 7 is a plan view of the device shown in FIG. 6.

The plant 1 consists of a plurality of work areas 10. In FIGS. 4-5, part of the plant 1 is shown consisting of four work areas 10 assembled near one another. Transit corridors 22 are formed between two work areas 10.

Each work area 10 contains at least one robotic unit 16 for moving and handling mechanical components being processed and objects inherent to processing and communicates with at least one other adjacent work area 10 by at least one automated overhead conveying unit 30, arranged above the separating walls 12 of the work areas 10 and passing above the corridors 22 that are featured between two different work areas 10.

Possibly, in the same work area 10, more than one overhead conveying unit 30 can be installed to connect a plurality of work areas 10 together. For example, in the work area 10 shown in FIGS. 2-3, there are four overhead conveying units 30, one for each side of the square work area 10, arranged perpendicularly and above the walls 12 of the area 10.

With reference to FIGS. 4-5, inside the work area 10, there may also be a processing station 18 for the mechanical components associated operationally with the robotic unit 16.

Each work area 10 is provided with control panels 24 for the operation of the electric units in the area 10, like the robotic unit 16, the processing station/s 18, the overhead conveying units 30, etc . . . .

Further, each work area 10 is connected to supply lines 26 for the supply of energy, air, fluids, and data. In the embodiment of FIG. 2, the supply lines 26 are arranged above the work area and follow the perimeter bounded by the walls 12. Other possible solutions for the position of the supply lines 26 are not ruled out.

The work area 10 can also contain internally storage units that are not shown in the attached figures, which are suitable for containing products being processed or objects inherent to processing. The area 10 can also contain movable guards that are suitable for compartmentalizing the work area 10 into different zones. In this manner, the operator accesses the inside of one of the isolated zones of work area 10 in total safety, without stopping the production cycle of the other zones in the same work area 10.

In FIGS. 6-9, the automated overhead conveying unit 30 is shown. Each overhead conveying unit 30 is supported by supports 28. In the embodiment shown in the attached figures, the supports 28 are fixed to the inner floor of each of the work areas 10 that the conveying unit 30 puts in communication. The possibility is not ruled out that the supports 28 are fixed to the ceiling of the structure that houses the plant 1 or to the perimeter walls 12 if they are physical.

The overhead conveying unit 30 comprises a box-shaped outer casing 31. In the shown embodiment, the outer casing 31 is devoid of the summit surface. On the side surfaces 32 and 33 that face the work areas 10 connected by the overhead conveying unit 30, openings 34 and 35 are obtained respectively that are necessary for permitting the robotic unit 16 to handle the mechanical components and the objects inherent to processing conveyed on the overhead conveying unit 30.

Inside the cavity defined by the box-shaped casing 31, there is a fixed guide 36, which, in the embodiment shown, bounds a circuit having an oval shape. The possibility of using guides 36 having a different shape is not ruled out.

A plurality of conveying plates 38 circulate along the fixed guide 36: the robotic handling units 16 place on the conveying plates 38 the objects to be conveyed and pick the objects to be conveyed therefrom once conveyed to the desired work area 10. The conveying plates 38 are connected to anchoring systems, which for the sake of simplicity are not shown in the attached figures, and are moved by one or more dragging groups 39.

Figure 10:
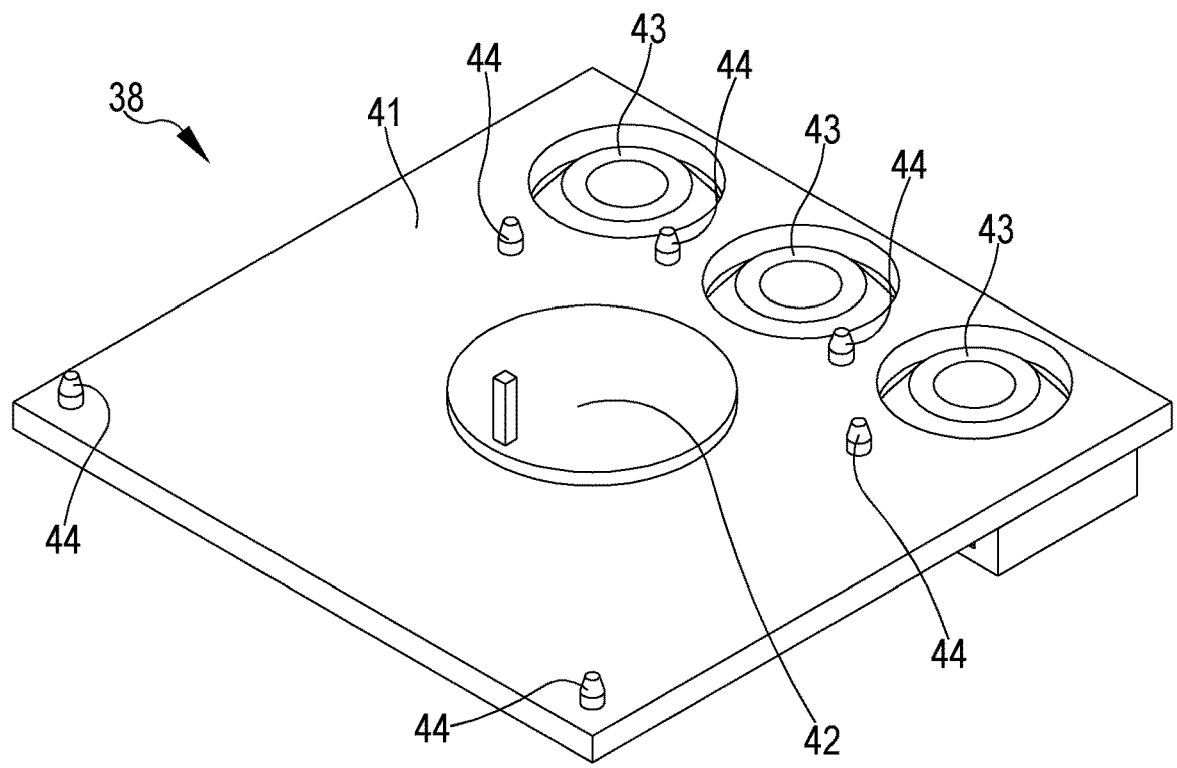
FIG. 10 is a perspective view of a component used in the modular unit.
Figure 11:
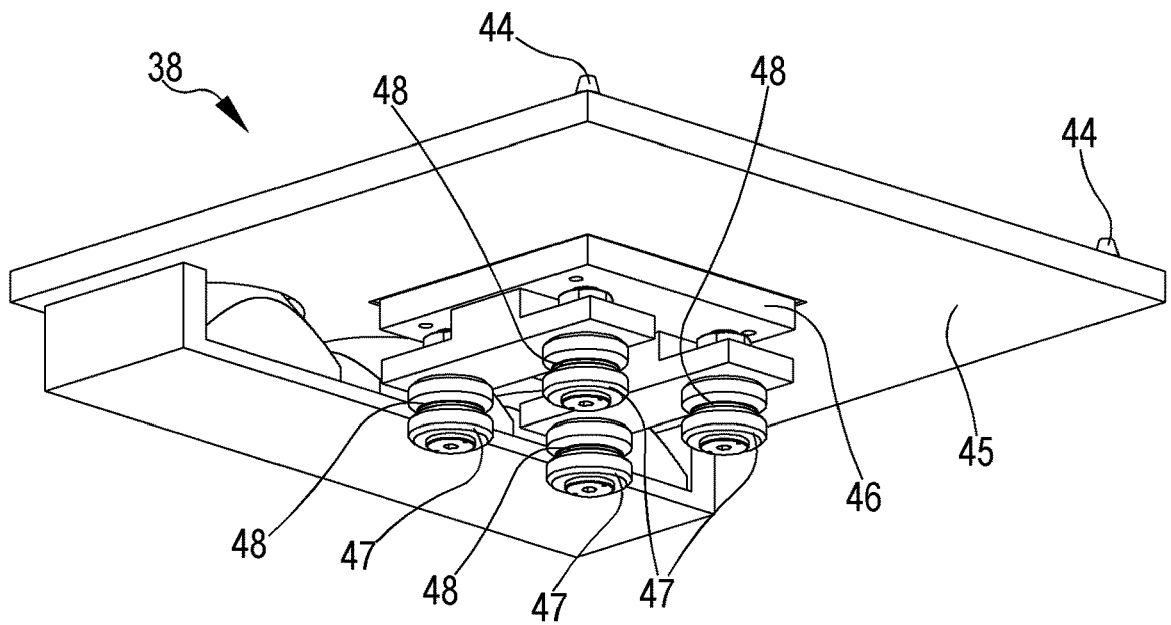
FIG. 11 is a perspective view from another point of view of the component in FIG. 10.
Figure 12:
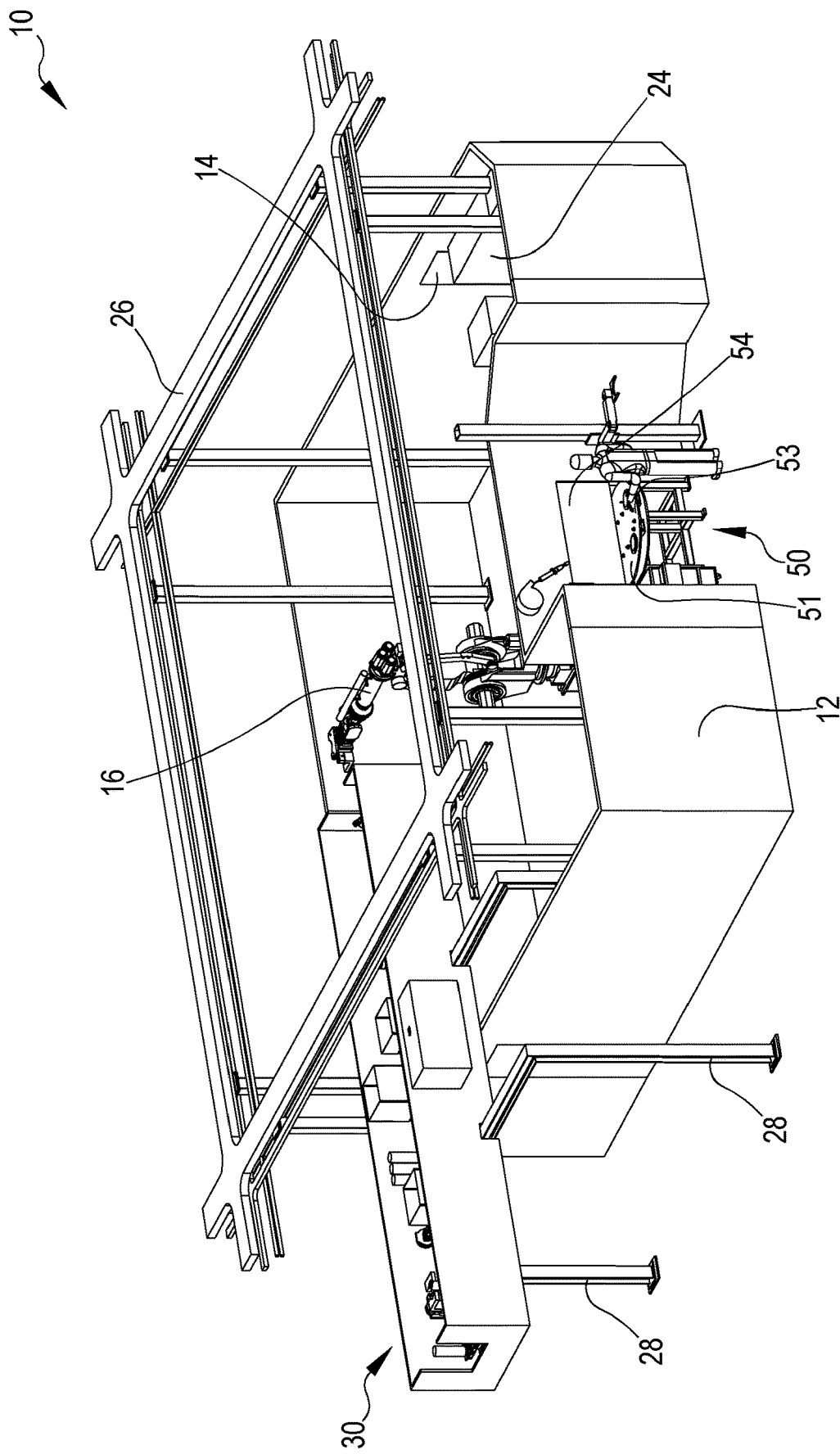
FIG. 12 is another embodiment of a modular unit of the plant.
Figure 13:
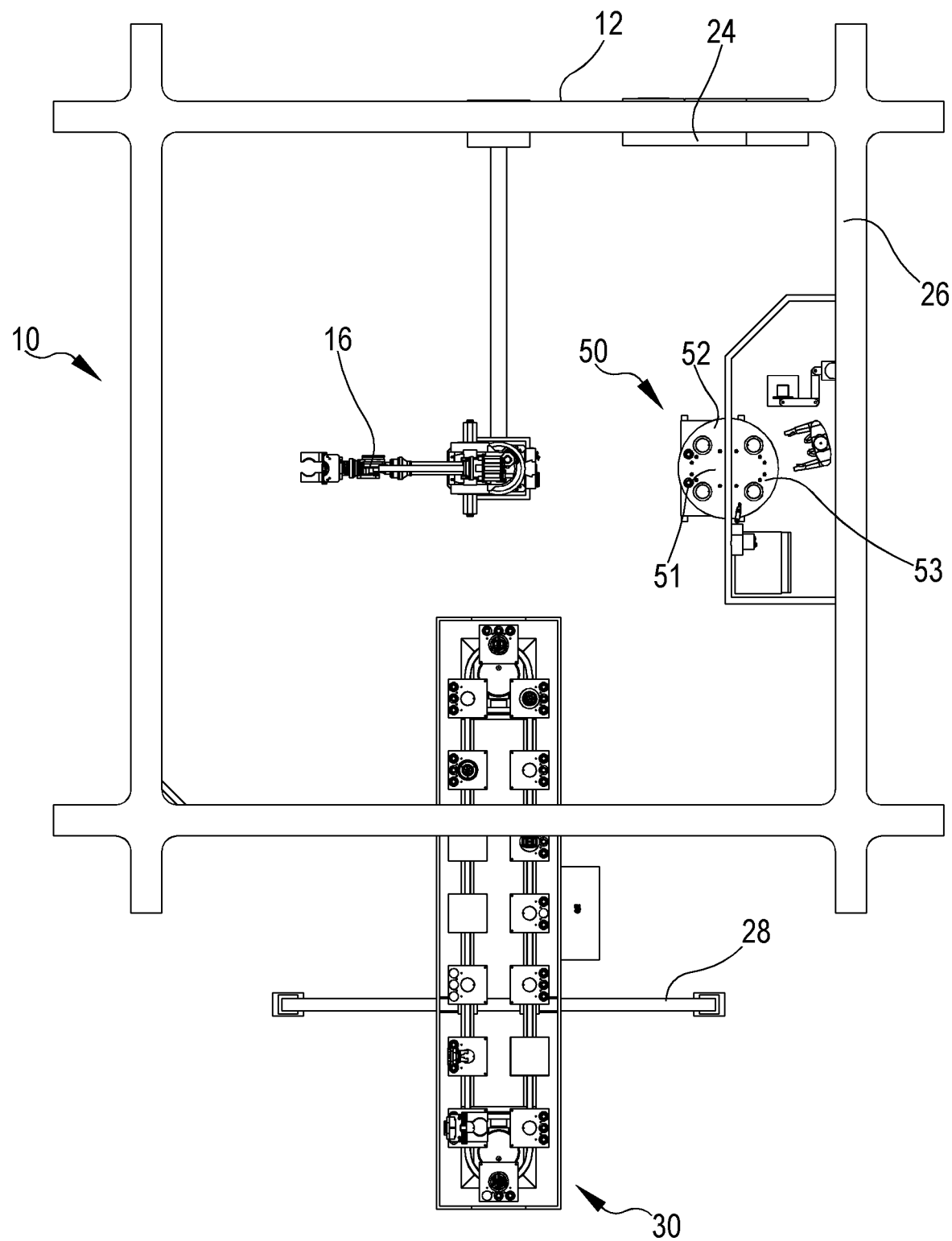
FIG. 13 is a plan view of the modular unit in FIG. 12.
Figure 14:
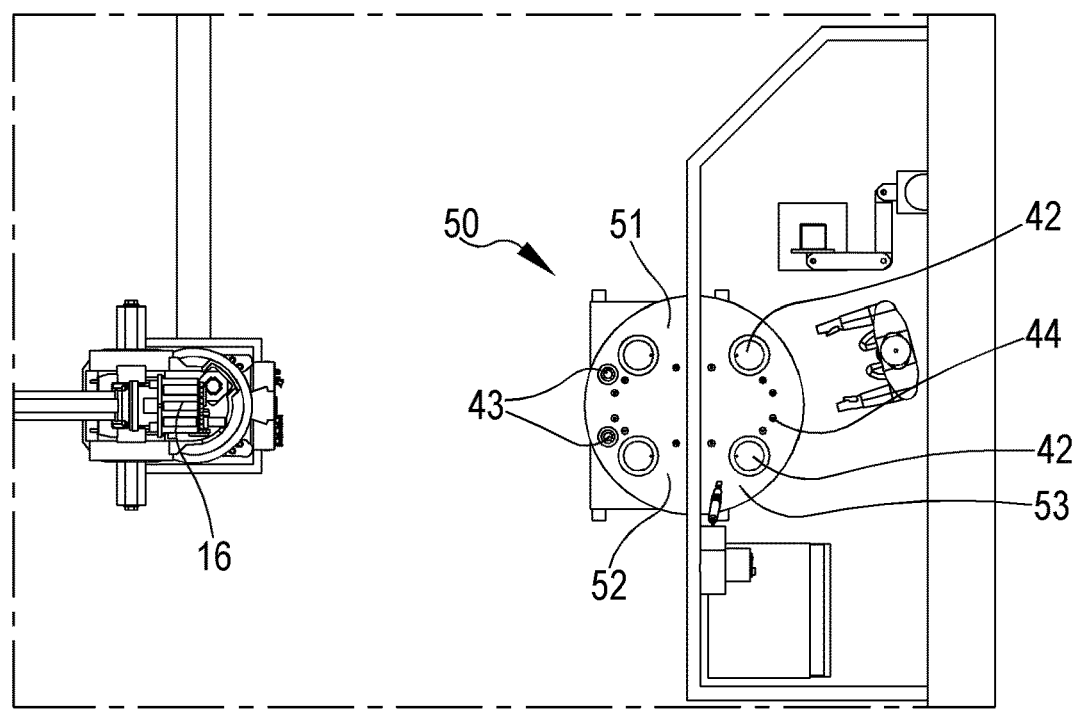
FIG. 14 is a detail of FIG. 13.
Figure 15:
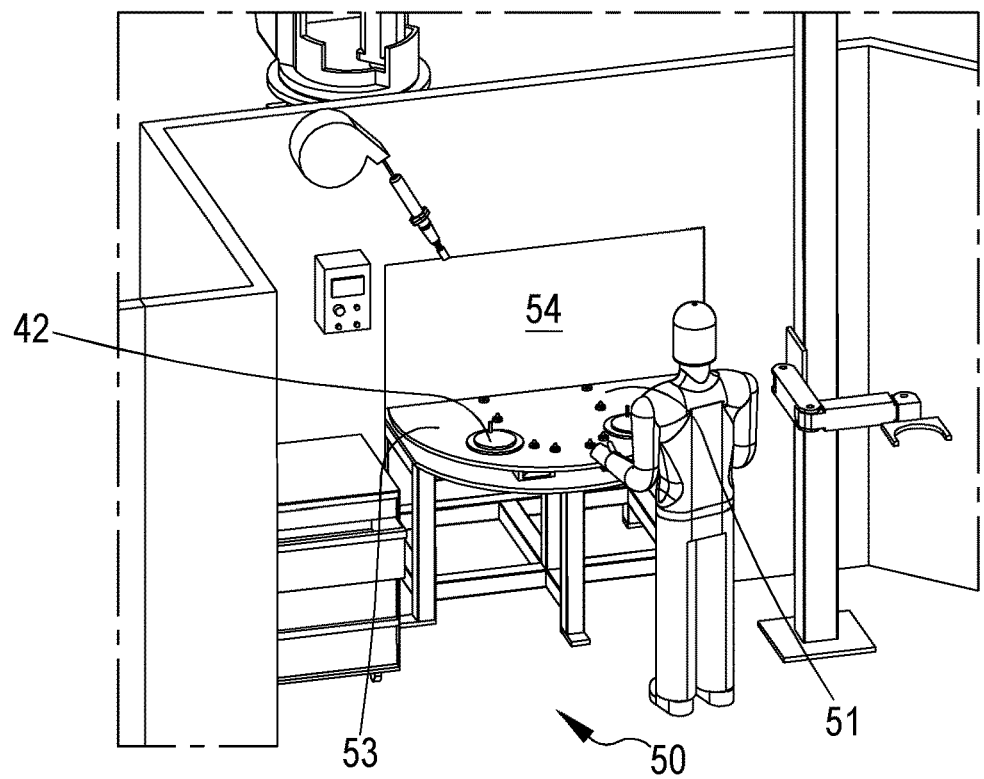
FIG. 15 is a detail of FIG. 12.

One embodiment of the conveying plates 38 is shown in FIGS. 10-11. The upper surface 41 of the plate comprises coupling elements 42, 43, 44 designed for receiving each type of object or product that it is necessary to convey from one work area 10 to the other inside the plant 1. The coupling elements 42, 43, 44 have to ensure the orientation and stability of the object during the movement step along the fixed guide 36.

The central seat 42 is shaped to receive the pallets on which the bar pieces are clamped that will have to be processed at the different work areas 10 to provide the final mechanical component. In FIG. 9, a coupling between the conveying plate 38 and the pallet with a component being processed is shown near the opening 34. The side seats 43 are on the other hand shaped for receiving other objects inherent to the processing, like work tools. The pins 44 on the other hand perform the task of retaining grippers for robots and boxes containing for example scrap, chips, pieces, etc.

The lower surface 45 of the plate 38 comprises coupling elements 47 for coupling with the fixed guide 36 fitted to a support 46 fixed on the lower surface 45. In the embodiment shown in FIG. 11, there are four coupling elements 47 of cylindrical shape on which annular grooves 48 are obtained that are suitable for coming into contact with the side portions of the fixed guide 36. Owing to the coupling elements 47, the plate 38 is maintained stably in position whilst it is moved by the dragging groups 39 along the fixed guide 36, so as to ensure correct conveying of the mechanical components or of the objects inherent to the processing.

The work area 10 can possibly provide also one exchange position 50 for exchanging objects with the outside, obtained near one of the perimeter walls 12. The work area 10 provided with exchange position 50 is shown in FIGS. 12-15. The exchange position 50, in this particular embodiment, comprises a rotating circular table 51. Other possible embodiments of the exchange position 50 are not ruled out, such as for example a linear or loop guide system.

A first half 52 of the rotating table 51 is located inside the work area 10, whilst the second half 53 is located outside the work area 10. The two halves 52, 53 are separated by a separating wall 54, which can be of a physical or virtual type. In the embodiment of FIGS. 12-15, the separating wall 54 is a plate fixed perpendicularly to the table 51 and isolates the outer space from the work area 10. On the table 51, there are the same coupling elements 42, 43, 44 obtained on the conveying plate 38, on which objects can be arranged that are to be taken outside or inside the work area 10.

The plant 1, consisting of a plurality of work areas 10 as disclosed, can work automatically. Possibly, if necessary or preferred, it is also possible to use workers to perform certain functions such as for example quality control.

The distance that separates two adjacent work areas has to be such as to create a corridor 22 that is wide enough to permit the transit of operators who access the plant 1 and of corresponding operating tools, such as for example forklift and scaffoldings.

Figure 16:
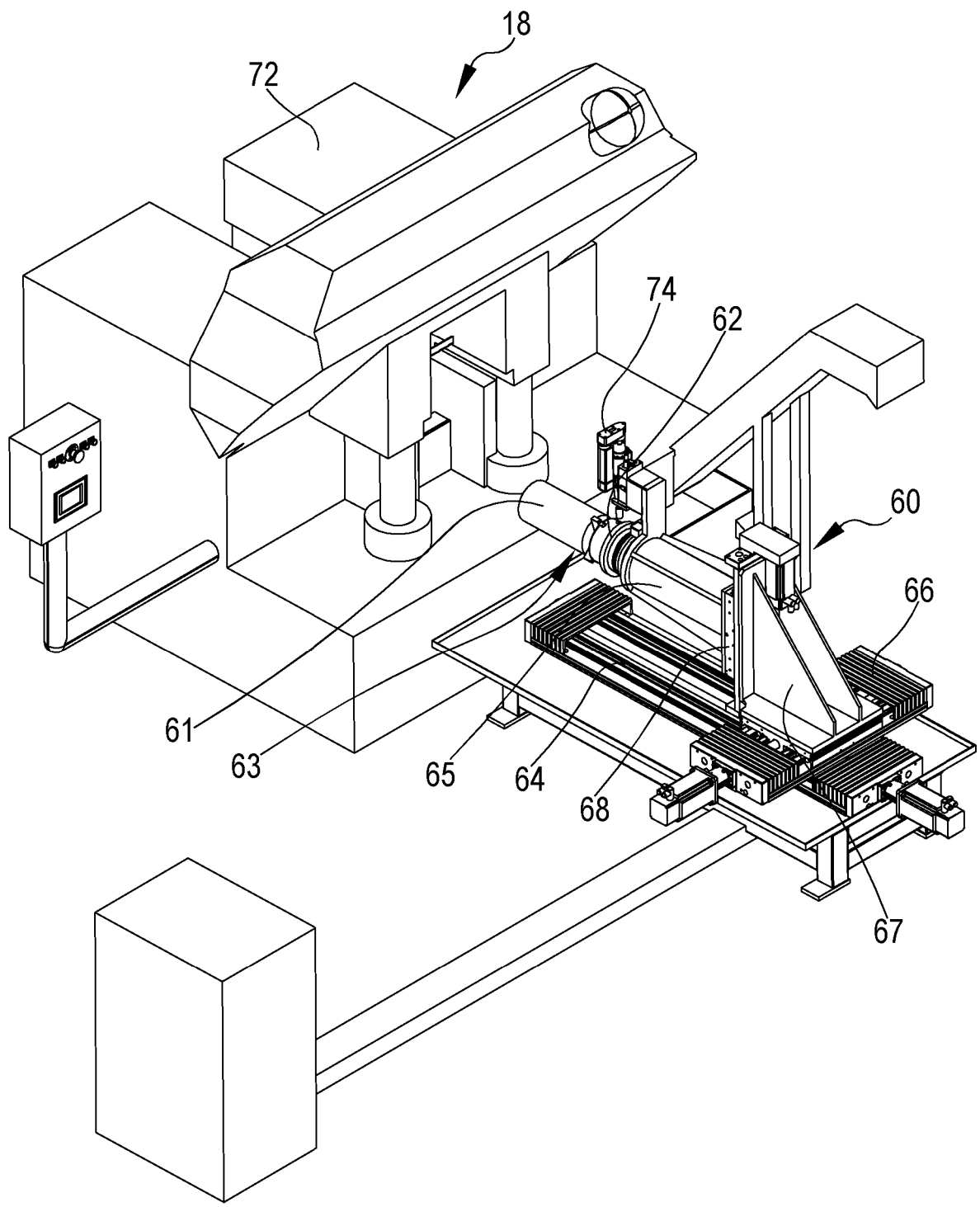
FIG. 16 is a perspective view of a device used in the plant.
Figure 17:
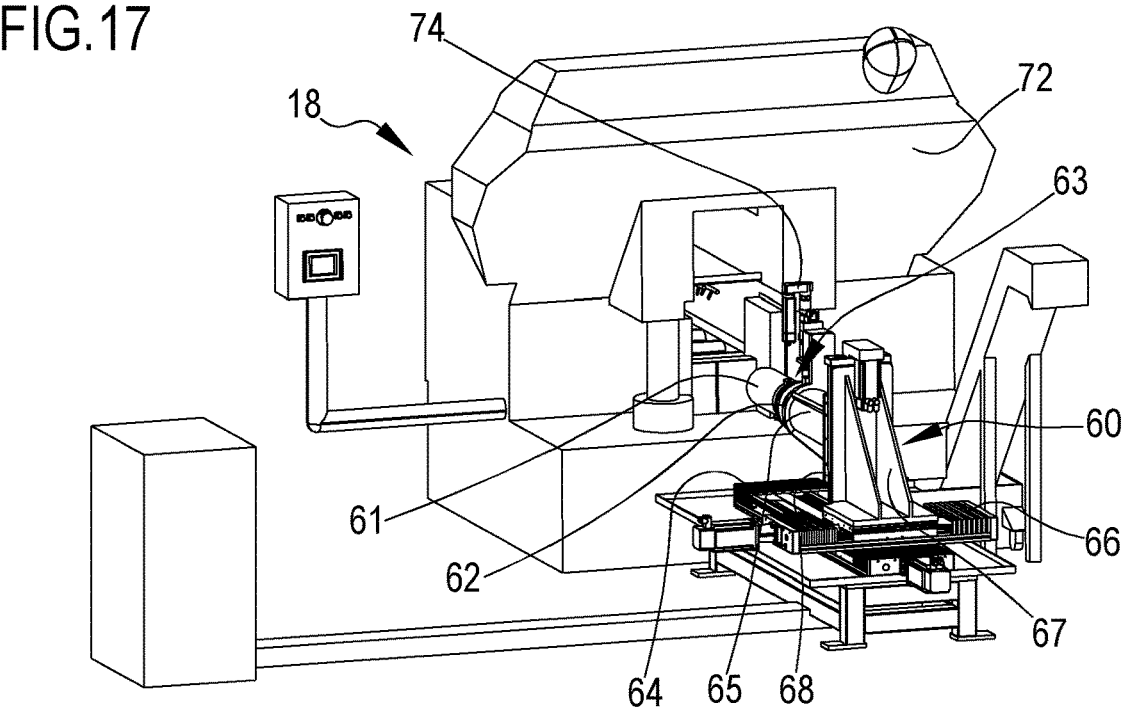
FIG. 17 is another view of the device in FIG. 16.
Figure 18:
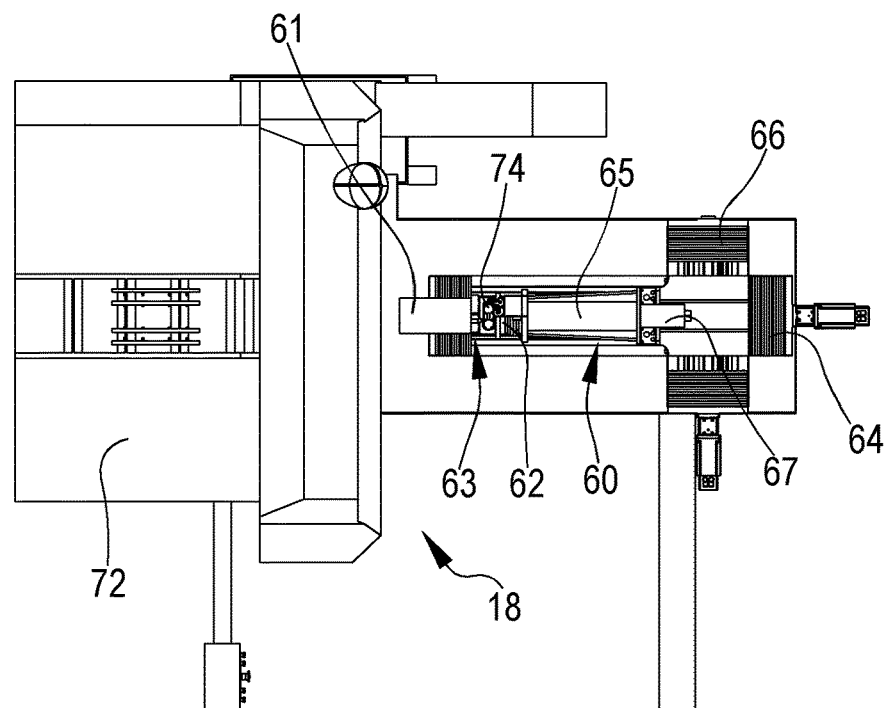
FIG. 18 is a plan view of the device in FIG. 16.

In the disclosed embodiment, the plant 1 is set up to manufacture mechanical components mainly by chip removal techniques. With reference to FIGS. 16-18, the bar piece 61 to be processed is placed and clamped on a pallet 62, forming the pallet/bar assembly 63. The pallets with bar 63 start to circulate from one work area 10 to another, where at the processing stations 18 of the various work areas 10, the bar piece 61 is altered until it takes on the final shape of the component.

In order to centre, place and clamp the bar piece 61 on the pallet, the processing station 18 may comprise a centring and locking device 60 is used that is shown in FIGS. 16-18. The centring and locking device 60 consists of a main body 67 to which a head portion 65 is fitted. The centring and locking device 60 is movable along guides 64 and 66 that are perpendicular to one another whilst the head portion 65 is movable along guides 68 fitted to the main body 67.

Initially, a robotic unit 16 deposits the pallet 62 on the end of the head portion 65. The centring and locking device 60 approaches a sawing machine 72 where the bar is arranged from which the bar piece 61 will be cut to be clamped on the pallet 62. Through coordinated movements along the guides 66, 68, the head portion 65 is arranged on an axis with the bar from which the bar piece 61 will be cut. Subsequently, the centring and locking device 60 moves along the guide 64 so as to bring the head portion 65 to the bar from which the bar piece 61 will be cut. Once the bar and the pallet 62 are in contact, a screwing system 74 locks the bar and the pallet 62. After locking, the sawing machine 72 cuts part of the bar 61, on the basis of the type of processing that it will undergo inside the plant 1. Once the cutting has been completed, the centring and locking device 60 moves away from the sawing machine 72 along the guide 64. Lastly, a robotic unit 16 picks the pallet with bar 63, which is sent to the work areas 10 or is placed at a processing station 18 or at an exchange position 50 of the same area.

The main advantage of the centring and locking device 60 is being able to perform cutting actions when the bar piece 61 is already placed and clamped on the pallet 62.

The pallets with bar 63, the tools and the objects inherent to the processing are handled by the robotic units 16 in each work area 10.

Once the general object has been picked, it can be placed at the processing station 18, at the exchange position 50 (if featured), in warehouses (if featured) or can be placed on the only or on one of the overhead conveying units 30 so that it can be moved to a subsequent work area 10.

The height of the overhead conveying unit 30 has to be such as to be easily reached by the robotic unit 16 featured in the work areas 10 and to enable operators and instruments to transit with facility through the corridors 22 between the various work areas 10.

The side surfaces 37 of the overhead conveying unit 30, facing the corridor 22 featured between two adjacent work areas 10 and connected by the overhead conveying unit 30, have a height that is such as not to permit the accidental fall of moving objects onto the overhead conveying unit 30 in the corridor 22 below, so as to avoid possible accidents to the operators moving along the corridors 22 of the plant 1.

The motion of the conveying plates 38 along the fixed guide 36 is synchronized with the movement of the departure robotic unit 16, in such a way that there is a conveying plate 38 near the opening 34 or 35 ready to receive the object to be conveyed. Once the object is secured in the relative coupling element 42, 43, 44, the conveying plate 38 starts to move along the fixed guide 36 to the opposite end of the overhead conveying unit 30. The plate 38 stops near the opening 34, 35 opposite the opening where the object has been loaded. Subsequently the object is picked from the robotic unit 16 of the destination work area 10.

Another function that can be performed by the overhead conveying unit 30 is temporary parking of objects inherent to processing, such as tools, grippers, pallets with bars 63, boxes for collecting chips, scrap etc.

The walls 12 of the work area mainly perform two functions. The first function consists of separating and functionally circumscribing different work areas 10 having different functions, i.e. provided with different processing stations 18. The second function consists of protecting operators who access the plant 1, to avoid possible workplace health hazards for operators.

Owing to the walls 12, if they are physical barriers, any malfunction that may harm the health of an operator working at the plant 1 remains, at least initially, circumscribed inside the work area 10. If on the other hand the separating walls are of virtual type, as soon as the operator traverses the separating walls that are of virtual type, the automatic function of the area 10 is interrupted, preventing possible hazards.

Access 14 to each work area 10 remains shut during the operating step of the robotic unit 16 and can be crossed only when the robotic unit 16 is disabled. The functions performed by the machines inside the work area 10 are automated, thus the operator enters through the point of access 14 only during the maintenance step or repair in the event of a machine malfunction. The maintenance operator gains access in total safety, once automatic operation of the machines is disabled and there is certainty that there are no severe health hazards for the operator inside.

The operator can interact with the component being processed, picking other tools and other objects inherent to the processing featured in the work areas 10 by the exchange position 50. Alternatively the operator can place tools and other objects inherent to the processing inside the work area 10.

The robotic unit 16 of the work area 10 concerned inserts the pallet with the component being processed 63, which has to be subjected to manual work operations by the operator, or other objects inherent to the processing, that have to be picked by the operator, in the appropriate coupling elements 42, 43, 44 of the inner half 52 of the rotating table 51.

Through a command of the operator, the table 51 rotates by half a revolution, exposing the inner half 52, with the pallets 63 or other objects inserted, outside the work area 10, whereas the outer half 53 faces inside the work area 10.

Alternatively, the operator can insert inside the appropriate coupling elements 42, 43, 44, featured on the outer half 53, pallets with bars 63 or other objects inherent to the processing to be sent inside the work area 10, then rotate by half a revolution the table 51 so as to face the outer half 53 inside the work area 10.

There are no limitations to the shape and dimensions of the work areas provided that they are functionally integrated inside the plant and ensure safety and convenience for the operator if provided inside the plant.

The expansion of the work areas depends on multiple factors, such as the dimensions of the building in which the plant is assembled and the number of machines featured inside the work area.

The possibility is not ruled out of associating with the same work area multiple processing stations, which are operationally associated with multiple robot units.

Owing to the plant as disclosed, the limits of the prior art have been overcome. The modular nature of the work areas enables automatic and at the same time flexible processing plants to be devised that are thus adaptable to the quantity of processing tasks necessary for obtaining the final mechanical component.

The functional subdivision into work areas and the presence of overhead conveying units results in the presence of a network of corridors that run between the work areas. The operators are able to move safely between the corridors, which are separated by the work zones separated by the walls of the work areas. Further, maintenance of the various machines of the plant is simplified and easy to perform.

The general structure of the plant shown can be used extensively to manage products, not necessarily for processing components by chip removal but also for example for automatic storage of products.

The invention claimed is:

1. A plant for managing products, including a plurality of work areas, each bounded by perimeter walls, each of the work areas including at least one robotic unit for moving and handling the products, and wherein the work areas are connected together by at least one overhead conveying unit for conveying the products from one work area to another, wherein the overhead conveying unit that connects two of the adjacent work areas extends above the perimeter walls and above a corridor therebetween.

2. The plant for managing products according to claim 1, intended for the processing of components and objects inherent to processing, wherein the work area comprises at least one processing station of the components that is associated operationally with the robotic unit, wherein a plurality of pallets is featured that are suitable for supporting components being processed, configured for being handled by the robotic units, so as to provide support to the component inside a work area, during conveying between one of the work areas and another and in the processing station.

3. The plant for managing products according to claim 1, wherein the overhead conveying unit is supported by lower and/or upper supports at the work areas that the unit put in communication.

4. The plant for managing products according to claim 1, wherein the overhead conveying unit comprises an outer casing, provided with openings obtained on the side surfaces facing the work areas and provided with a fixed guide fitted in the cavity formed by the outer casing on which a plurality of conveying plates move.

5. The plant for managing products according to claim 4, wherein on the upper surface of the conveying plate coupling elements are obtained that are suitable for receiving pallets with components being processed and other objects inherent to processing that it is necessary to convey from one of the work areas to the other inside the processing plant.

6. The plant for managing products according to claim 5, wherein on the lower surface coupling elements are provided on which grooves are obtained that are suitable for coupling with the edges of the fixed guide, in order to maintain in equilibrium the conveying plates moving on the fixed guide.

7. The plant for managing products according to claim 1, wherein the work area comprises at least one exchange position obtained in the perimeter walls to enable components or other objects inherent to processing to be moved outside and/or inside the area.

8. The plant for managing products according to claim 7, wherein the exchange position comprises a rotating circular table, on which coupling seats are obtained to receive pallets with components being processed and other objects inherent to processing, and a separating wall that divides the table into two parts and separates the work area from the outside environment.

9. The plant for managing products according to claim 2, wherein the processing station comprises a centering and locking device for centring and locking an unprocessed processing component on a pallet and a device for initial processing of the unprocessed processing component.

10. The plant for managing products according to claim 9, wherein the centring and locking device comprises a main body, which is movable along guides that are perpendicular to one another, wherein the main body is provided with a head portion to which the pallet is fitted, which is movable along guides fitted to the main body, wherein the centering and locking device moves along the guides to align and place the pallet fitted to the head portion in contact with the unprocessed processing component.

11. The plant for managing products according to claim 9, wherein the pallet and unprocessed processing component are locked together by a coupling device at the moment of contact between the unprocessed processing component and the pallet, for subsequent processing of the unprocessed processing component by the initial processing device.

\* \* \* \* \*